(12) United States Patent
Lee et al.

(10) Patent No.: US 7,991,002 B2
(45) Date of Patent: Aug. 2, 2011

(54) APPARATUS AND METHOD FOR IMPLEMENTING HANDOFF BETWEEN HETEROGENEOUS NETWORKS IN A WIRELESS COMMUNICATION SYSTEM

(75) Inventors: Sung-Jin Lee, Seoul (KR); Jung-Je Son, Seongnam-si (KR); Pan-Yuh Joo, Seoul (KR); Jun-Young Jung, Yongin-si (KR); Chong-Kwon Kim, Seoul (KR); Joon Yoo, Seoul (KR)

(73) Assignees: Samsung Electronics Co., Ltd (KR); Seoul National University Industry Foundation (KR)

( * ) Notice: Subject to any disclaimer, the term of this patent is extended or adjusted under 35 U.S.C. 154(b) by 1426 days.

(21) Appl. No.: 11/473,802

(22) Filed: Jun. 23, 2006

(65) Prior Publication Data
US 2007/0021119 A1    Jan. 25, 2007

(30) Foreign Application Priority Data
Jun. 23, 2005   (KR) ........................ 10-2005-0054416

(51) Int. Cl.
  *H04L 12/28*   (2006.01)
  *H04L 29/06*   (2006.01)
  *H04W 8/02*    (2009.01)
(52) U.S. Cl. .................... 370/467; 370/331; 455/436
(58) Field of Classification Search .......... None
  See application file for complete search history.

(56) References Cited

U.S. PATENT DOCUMENTS

| | | | |
|---|---|---|---|
| 6,519,457 B1* | 2/2003 | Jiang et al. | 455/442 |
| 6,671,735 B1* | 12/2003 | Bender | 709/238 |
| 6,810,259 B1* | 10/2004 | Zhang | 455/456.5 |
| 6,993,359 B1* | 1/2006 | Nelakanti et al. | 455/554.1 |
| 7,002,995 B2* | 2/2006 | Chow et al. | 370/485 |
| 7,082,114 B1* | 7/2006 | Engwer et al. | 370/331 |
| 7,260,399 B1* | 8/2007 | Oh et al. | 455/436 |
| 7,369,856 B2* | 5/2008 | Ovadia | 455/439 |
| 7,418,264 B2* | 8/2008 | Kim | 455/436 |
| 7,548,763 B2* | 6/2009 | Pan | 455/561 |
| 7,610,057 B2* | 10/2009 | Bahl et al. | 455/522 |
| 2003/0032451 A1* | 2/2003 | Hu | 455/560 |
| 2003/0134650 A1* | 7/2003 | Sundar et al. | 455/465 |
| 2004/0057393 A1* | 3/2004 | Bianchi et al. | 370/312 |
| 2004/0105434 A1* | 6/2004 | Baw | 370/355 |
| 2004/0120279 A1* | 6/2004 | Huckins | 370/328 |
| 2004/0136324 A1* | 7/2004 | Steinberg et al. | 370/238 |
| 2004/0213260 A1* | 10/2004 | Leung et al. | 370/395.3 |
| 2005/0083971 A1* | 4/2005 | Delaney et al. | 370/466 |

(Continued)

FOREIGN PATENT DOCUMENTS

JP    2000-278736    10/2000
(Continued)

*Primary Examiner* — Rafael Pérez-Gutiérrez
*Assistant Examiner* — Frank Donado
(74) *Attorney, Agent, or Firm* — The Farrell Law Firm, P.C.

(57) ABSTRACT

An apparatus and method for implementing a vertical handoff between a WLAN and a broadband wireless communication network are provided. The vertical handoff apparatus includes a base station (BS) of the broadband wireless network and at least one access point (AP) of the WLAN within the cell coverage area of the BS, and a switch for forwarding packets between the BS and the at least one AP and processing a handoff between the BS and the at least one AP.

3 Claims, 15 Drawing Sheets

U.S. PATENT DOCUMENTS

| | | | |
|---|---|---|---|
| 2005/0107086 A1* | 5/2005 | Tell et al. | 455/445 |
| 2005/0288023 A1* | 12/2005 | Kim et al. | 455/439 |
| 2006/0040656 A1* | 2/2006 | Kotzin | 455/426.2 |
| 2006/0088051 A1* | 4/2006 | Mulligan | 370/466 |
| 2006/0111111 A1* | 5/2006 | Ovadia | 455/439 |
| 2006/0215607 A1* | 9/2006 | Mitchel et al. | 370/331 |
| 2006/0252418 A1* | 11/2006 | Quinn et al. | 455/423 |
| 2006/0276189 A1* | 12/2006 | Kiernan et al. | 455/436 |
| 2007/0165537 A1* | 7/2007 | Magnusson et al. | 370/254 |
| 2007/0171869 A1* | 7/2007 | Salkintzis | 370/331 |
| 2008/0049694 A1* | 2/2008 | Kinoshita et al. | 370/338 |
| 2008/0192925 A1* | 8/2008 | Sachs et al. | 380/29 |
| 2009/0131053 A1* | 5/2009 | Sachs et al. | 455/436 |

FOREIGN PATENT DOCUMENTS

| | | |
|---|---|---|
| KR | 100460975 | 12/2004 |
| KR | 1020050037891 | 4/2005 |
| KR | 100578305 | 5/2006 |

* cited by examiner

APPARATUS AND METHOD FOR IMPLEMENTING HANDOFF BETWEEN HETEROGENEOUS NETWORKS IN A WIRELESS COMMUNICATION SYSTEM

PRIORITY

This application claims priority under 35 U.S.C. §119 to an application entitled "Apparatus and Method for Implementing Handoff between Heterogeneous Networks in a Wireless Communication System" filed in the Korean Intellectual Property Office on Jun. 23, 2005 and assigned Serial No. 2005-54416, the contents of which are incorporated herein by reference.

BACKGROUND OF THE INVENTION

1. Field of the Invention

The present invention relates generally to an apparatus and a method for implementing handoff between heterogeneous networks in a wireless communication system, and in particular, to an apparatus and a method for implementing handoff between an Institute of Electrical and Electronics Engineers (IEEE) 802.11 network and an IEEE 802.16 network.

2. Description of the Related Art

The providing of services with diverse Quality of Service (QoS) levels at about 100 Mbps is an ongoing research area for a future-generation communication system, namely, a $4^{th}$ Generation (4G) communication system. The existing $3^{rd}$ Generation (3G) communication systems support approximately 384 kbps in a relatively poor outdoor channel environment and at most 2 Mbps in a relatively good indoor channel environment. Wireless Local Area Network (WLAN) and Wireless Broadband (WiBro) systems typically support 20 Mbps to 50 Mbps. In this context, studies have actively been conducted on guarantee of mobility and QoS for WLAN and WiBro supporting relatively high rates in the 4G communication system.

One of the studies concerns handoff between heterogeneous networks, WLAN and WiBro (or broadband wireless communication system). Generally, handoff refers to homogeneous handoff. However, the IEEE 802.21 working group is developing standards to enable handoff between heterogeneous networks, this inter-technology handoff will be provided seamlessly in the 4G communication system.

The IEEE 802.11 Task Group (TG) f deals with support of handoff between 802.11 Access Points (APs) and the IEEE 802.11 standards which defines only handoff-associated messages. Typically, the cell coverage of an IEEE 802.11 network ranges within tens to hundreds of meters, and an IEEE 802.16 network reaches a few kilometers. Thus, it is meaningless to separate the two networks. The IEEE 802.11 APs are expected to increase the capacity of IEEE 802.16 Base Stations (BSs) or cover shadowing areas that the 802.16 BSs cannot cover. The 802.11 network will be integrated into the 802.16 network rather than configuring a network by separating them. Hereinafter, IEEE may be omitted to refer standard specification.

A description will be made below of a conventional handoff between a WLAN and a broadband wireless communication network.

FIG. 1 illustrates a conventional system model in which the 802.11 network coexists with the 802.16 network. The 802.11 network and the 802.16 network operate separately.

In contrast to the 802.11 standard which has not specified handoff between 802.11 APs, the 802.11f draft provides a simple definition of handoff. In order to support a handoff between the 802.11 APs, communications should be enabled between them by the use of an item called a Wireless Switch (WS) and messages defined by the 802.11f draft. Meanwhile, an 802.16 handoff is performed in the manner defined by the 802.16e draft.

The terms used herein "handoff between homogeneous networks" and "horizontal handoff" are interchangeably used with the same meaning, and "handoff between heterogeneous networks" and "vertical handoff" are also interchangeably used with the same meaning. In addition, the 802.11 network and the 802.16 network are called "WLAN" and "broadband wireless communication network", respectively.

Now a description will be made of a conventional handoff technique based on the above description.

Horizontal Handoff Between IEEE 802.11 APs

As described above, the IEEE 802.11 TG f specifies simple messages for handoff between APs. A Subscriber Station (SS) shall initiate a handoff procedure according to the 802.11f draft. A reassociation request message and a reassociation response message are defined to support handoff in the IEEE 802.11 standards. The reassociation request message further includes an old AP field in addition to an association request message, and the reassociation response message is identical to an association response message.

In the handoff procedure as provided by the 802.11f draft, the SS dissociates from an old AP and reassociates with a new AP. The 802.11f defines an Inter-Access Point Protocol (IAPP) which defines messages exchanged between APs, for handoff. Such IAPP messages include IAPP ADD-notify, IAPP MOVE-notify, and IAPP MOVE-response.

Table 1 below illustrates the format of the IAPP ADD-notify message.

TABLE 1

| Information | Size (bytes) | Notes |
|---|---|---|
| MAC Address | 6 | Address of Mobile Subscriber Station (MSS) |
| Sequence Number | 2 | Sequence number of association request frame |
| Timeout | 2 | Timeout period |

Table 2 illustrates the format of the IAPP MOVE-notify message.

TABLE 2

| Information | Size (bytes) | Notes |
|---|---|---|
| MAC Address | 6 | Address of Mobile Subscriber Station (MSS) |
| Sequence Number | 2 | Sequence number of association request frame |
| Old AP | 6 | Address of old AP |
| Timeout | 2 | Timeout period |

Table 3 illustrates the format of the IAPP MOVE-response message.

TABLE 3

| Information | Size (bytes) | Notes |
|---|---|---|
| MAC Address | 6 | Address of Mobile Subscriber Station (MSS) |
| Sequence Number | 2 | Sequence number of association request frame |

TABLE 3-continued

| Information | Size (bytes) | Notes |
| --- | --- | --- |
| Old AP | 6 | Address of old AP |
| New Basic Service Set Identification (BSSID) | 6 or 8 | BSSID of new network |

FIG. 2 illustrates a conventional handoff procedure in an 802.11 WLAN.

Referring to FIG. 2, an SS 280 associates with a first AP 250 by association request and response messages in step 211. The first AP 250 transmits an IAPP ADD-notify message to a WS 210, notifying the entry of the S 280 into the first AP 250. The WS 210 multicasts the IAPP ADD-notify message to APs within the same domain in step 215. It is assumed that a second AP 270 is located in the same domain.

When the SS 280 moves to the second AP 270, i.e. a handoff to the second AP 270 is requested in step 217, it transmits a reassociation request message to the second AP 270 and receives a reassociation response message for the reassociation request from the second AP 270 in step 219.

As the SS 280 has associated with the second AP 270, the second AP 270 transmits an IAPP MOVE-notify message to the first AP 250 via the WS 210 in step 221. The first AP 250 dissociates from the SS 280 in step 223 and transmits an IAPP MOVE-response message including information about a requested context to the second AP 270 via the WS 210 in step 225. In this way, the handoff is completed.

Horizontal Handoff Between IEEE 802.16 BSs In the IEEE 802.16 network, initialization between a base station (BS) and a subscriber station (SS) (or MSS) is based on IEEE 802.16-2004 and horizontal handoff is implemented in compliance with the IEEE 802.16e draft.

FIG. 3 is a flowchart illustrating a conventional handoff procedure in an 802.16e broadband wireless communication network.

Referring to FIG. 3, at an initialization or when a signal is disconnected from a BS, an SS selects a cell (or BS) to camp on by downlink channel scanning in step 301. For example, the SS scans successive downlink channels starting with the latest received channel until a valid downlink signal is received.

After the cell selection, the SS acquires physical synchronization using the preamble of a downlink (DL) frame received from the selected BS in step 303. If a DL-MAP and a Downlink Channel Descriptor (DCD) are received successfully, it is considered that synchronization with the BS has been acquired.

The SS receives an Uplink Channel Descriptor (UCD) from the BS and acquires uplink parameters from the UCD information in step 305. Based on the uplink parameters, if its determined that the uplink is not available to the SS, then the SS starts channel scanning for another channel. However, if the uplink is available, the SS waits for the next DL-MAP and UL-MAP and checks an initial ranging area allocated by the BS.

In step 307, the SS performs ranging. Specifically, the SS transmits an RNG-REQ message to the BS according to the initial ranging area. The RNG-REQ message is formatted as follows.

TABLE 4

| Information | Size (bytes) | Notes |
| --- | --- | --- |
| Management Type | 1 | ID (4) identifying RNG-REQ |
| Downlink Channel ID | 1 | 8-bit ID of downlink channel |
| TLV Encoded Information | variable | MAC address, version, capability of SS |

The SS initially transmits the RNG-REQ message at a minimum power level, but if not receiving a response from the BS, it gradually increases the power level. The BS replies to the RNG-REQ message with RNG-RSP, allocates a Connection ID (CID) to the SS, and allocates an individual initial ranging area for correcting a transmission power level and a timing offset to the SS. The structure of RNG-RSP is illustrated in Table 5 below.

TABLE 5

| Information | Size (bytes) | Notes |
| --- | --- | --- |
| Management Type | 1 | ID (5) identifying RNG-RSP |
| Uplink Channel ID | 1 | 8-bit ID of uplink channel |
| TLV Encoded Information | variable | Timing control information, power control information, basic CID |

The SS then exchanges RNG-REQ and RNG-RSP with the BS through the individual initial ranging area, thereby adjusting the transmission power and timing.

After the ranging, the SS negotiates basic capabilities with the BS by exchanging SS Basic Capability Request (SBC-REQ) and SS Basic Capability Response (SBC-RSP) in step 309. Table 6 below illustrates the format of SBC-REQ.

TABLE 6

| Information | Size (bytes) | Notes |
| --- | --- | --- |
| Management Type | 1 | ID (26) identifying SBC-REQ |
| TLV Encoded Information | variable | Capabilities supported by SS |

Table 7 below illustrates the format of SBC-RSP.

TABLE 7

| Information | Size (bytes) | Notes |
| --- | --- | --- |
| Management Type | 1 | ID (27) identifying SBC-RSP |
| TLV Encoded Information | variable | Capabilities supported by BS among SS-requested capabilities |

In step 311, the SS performs authorization and exchanges keys. The SS then associates with the BS by exchanging Registration Request (REG-REQ) and Registration Response (REG-RSP) with the BS in step 313.

Table 8 below illustrates the configuration of the REG-REQ message.

TABLE 8

| Information | Size (bytes) | Notes |
| --- | --- | --- |
| Management Type | 1 | ID (6) identifying REG-REQ |
| TLV Encoded Information | variable | Message authentication code (MAC), uplink CID, IP information, and SS management information |

Table 9 below illustrates the format of the REG-RSP.

TABLE 9

| Information | Size (bytes) | Notes |
| --- | --- | --- |
| Management Type | 1 | ID (7) identifying REG-RSP |
| Response | 1 | Indicates whether REG-REQ reception is successful based on MAC |
| TLV Encoded Information | variable | Response to management information of REG-REQ |

Following the registration, the SS establishes an IP connection in step 315. That is, the SS negotiates an IP version that the BS supports, and is allocated an IP address by a Dynamic Host Configuration Protocol (DHCP) mechanism, that receives date and time for the time stamp of log files. In step 317, the SS transmits operational parameters to the BS. Steps 315 and 317 are optional.

When the initialization procedure is completed in this way, the SS establishes a connection in step 319 and operates normally by the connection in step 321. During the normal operation, the SS searches neighboring BSs by channel scanning at predetermined intervals.

Later, if a handoff is determined, the SS terminates the connection to the old BS (or source BS) in step 327 and selects a target BS in step 329.

In steps 331, 333 and 335, the SS performs a new network entry for the target BS in a similar manner to the above-described initialization procedure. The new network entry involves the process of searching for a cell offering a high Signal-to-Interference plus Noise Ratio (SINR) without association, before normal registration to the cell. Hence, the old BS does not know the movement state of the SS.

When finally deciding on the target BS, the SS performs re-authorization in step 337 and carries out re-registration and re-establishes service flows in step 339. Thus, the SS associates with the target BS in step 339. In step 341, the SS operates in a normal manner by the connection to the new BS.

Meanwhile, the SS can re-establish an IP connection in step 343. In case of a "make-before-break" handoff, the SS terminates every connection to the old BS in step 345.

The IEEE 802.16e working group is working on standardizing mobile wireless MAN for supporting the mobility of the SS, while keeping backward compatibility with the 802.16 standards. To a Mobile SS (MSS), a BS broadcasts a Neighbor Advertisement (MOB_NBR-ADV) message including information about neighboring BSs to all MSSs within the cell coverage. Table 10 below illustrates the structure of the MOB_NBR-ADV message.

TABLE 10

| Information | Size (bytes) | Notes |
| --- | --- | --- |
| Management Type | 1 | ID (53) identifying MOB_NBR-ADV |
| Operator ID | 3 | Unique network ID |
| Configuration Change Count | 1 | Increases by 1 each time broadcast data is changed |
| N_NEIGHBORS | 1 | The number of neighbor BSs |
| Each Neighbor information | variable | BS ID, preamble index, PHY profile ID |
| HO Process Optimization | 1 | Information about processes that can be omitted at re-entry |

The MSS transmits a Scanning Interval Allocation Request (MOB_SCAN-REQ) message to the serving BS to search neighboring BSs for handoff and determines a neighboring BS's scanning interval based on a MON_SCN-RSP message replied for the MON_SCN-REQ message. Without a request form the MSS, the BS can allocate a neighboring BS's scanning interval. Table 11 below illustrates the configuration of the MON_SCN-REQ.

TABLE 11

| Information | Size (bytes) | Notes |
| --- | --- | --- |
| Management Type | 1 | ID (54) identifying MOB_SCN-REQ |
| Scan Duration | 1 | Scanning interval |
| Interleaving Interval | 1 | Overlap between normal operation interval and scanning interval |
| Scan Iteration | 1 | The number of iterative scannings |
| Message Authentication Code (MAC) | 21 | MAC ensuring integrity |

The format of MOB_SCN-RSP is given in Table 12 as follows.

TABLE 12

| Information | Size (bytes) | Notes |
| --- | --- | --- |
| Management Type | 1 | ID (55) identifying MOB_SCN-RSP |
| Scan Duration | 1 | Scanning interval |
| Start Frame | 4 bits | Scanning start frame |
| Interleaving Interval | 1 | Overlap between normal operation interval and scanning interval |
| Scan Iteration | 1 | Number of iterative scannings |
| Report Mode | 2 bits | Mode of reporting measurement to BS |
| Message Authentication Code (MAC) | 21 | MAC ensuring integrity |

IEEE 802.16e will define a "break-before-make" handoff in which an old channel is released before connection of a new communication channel and a "make-before-break" handoff in which disconnection of an old channel follows connection of a new channel. Yet, at present, standardization documents are mainly focusing on the "break-before-make" handoff.

FIG. 4 is a diagram illustrating a signal flow for a conventional overall handoff procedure in the 802.16 broadband wireless communication network. While handoff initiation can occur in both the BS and the MSS, the MS initiates a handoff in the illustrated case of FIG. 4.

Referring to FIG. 4, an MSS 410 acquires neighbor BSs 470 and 490 by frequency channel scanning and determines whether to implement a handoff by measuring received signal strengths form the neighbor BSs 470 and 490. If the MSS 410 decides on a handoff, it transmits a MOB_MSSHO-REQ message including information about the neighbor BSs 470 and 490 as candidate target BSs to a serving BS 450. Table 13 below illustrates the MOB_MSSHO-REQ.

TABLE 13

| Information | Size (bytes) | Notes |
| --- | --- | --- |
| Management Type | 1 | ID (57) identifying MOB_MSSHO-REQ |
| N_Recommended | 4 bits | Number of BSs that MSS sets as candidates |

TABLE 13-continued

| Information | Size (bytes) | Notes |
| --- | --- | --- |
| Each Candidate BS Information | variable | BS ID, preamble index, SINR, etc. |
| Message Authentication Code (MAC) | 21 | MAC ensuring integrity |

Upon receipt of MOB_MSSHO-REQ, the serving BS 450 transmits a HO-pre-notification message to the candidates BSs 470 and 490, notifying the handoff of the MSS 410 in steps 413 and 415. Simultaneously, the serving BS 450 informs them of the MSS ID, connection parameter, capabilities, requested BandWidth (BW), and QoS information of the MSS 410. In steps 417 and 419, the candidates BSs 470 and 490 transmit an ACKnowledgement in a HO-pre-notification-response message to the serving BS 450.

Meanwhile, the serving BS 450 determines a target BS based on information included in the HO-pre-notification-response message. It is assumed herein that the BS 490 is selected as the target BS. The serving BS 450 then transmits an HO-confirm message to the target BS 490 in step 421 and notifies the MSS 410 of the target BS 490 in a MOB_BSHO-RSP message in step 423. The present 802.16e draft has not defined the message format of HO-pre-notification. Table 14 below illustrates the format of the MOB_BSHO-RSP.

TABLE 14

| Information | Size (bytes) | Notes |
| --- | --- | --- |
| Management Type | 1 | ID (58) identifying MOB_BSHO-RSP |
| N_Recommended | 1 | Number of BSs that MSS sets as candidates |
| Each Candidate BS Information | variable | Store BS ID, preamble index, HO process optimization information in BS-recommended order |
| New_BS Information | variable | Information about BS that serving BS recommends among BSs that MSS has not selected as candidates |
| Message Authentication Code (MAC) | 21 | MAC ensuring integrity |

In step 425, the MSS 410 notifies the serving BS 450 of normal handoff completion in MOB_HO-IND. The serving BS 450 releases resources and a connection from the MSS 410 in step 427. The MSS 410 can cancel the handoff by a predetermined field of the MOB_HO-IND message or reject a handoff recommended by the serving BS 450.

In step 429, the MSS performs fast ranging based on known information about the target BS 490. The MSS 410 then enters a new network in steps 431 and 433, in the manner described with reference to FIG. 3. Table 15 below illustrates the configuration of the MOB_HO-IND.

TABLE 15

| Information | Size (bytes) | Notes |
| --- | --- | --- |
| Management Type | 1 | ID (59) identifying MOB_HO-IND |
| HO-IND_type | 2 bits | Indicates one of serving BS release, HO cancel, and HO reject |

TABLE 15-continued

| Information | Size (bytes) | Notes |
| --- | --- | --- |
| Message Authentication Code (MAC) | 21 | MAC ensuring integrity |

As described above, the present IEEE 802.11 and 802.16 standards define handoff between homogeneous networks, not yet handoff between heterogeneous networks. The 802.11 APs will increase the capacity of the 802.16 BSs or cover shadowing areas that the 802.16 BSs cannot cover. The integration of the 802.11 network into the 802.16 network requires an efficient handoff technique between the 802.11 and 802.16 networks.

SUMMARY OF THE INVENTION

An object of the present invention is to substantially solve at least the above problems and/or disadvantages and to provide at least the advantages described below. Accordingly, an object of the present invention is to provide an apparatus and method for implementing handoff between heterogeneous networks in a wireless communication system.

Another object of the present invention is to provide an apparatus and method for implementing handoff between an IEEE 802.11 network and an IEEE 802.16 network in a wireless communication system.

The above objects are achieved by providing an apparatus and method for implementing a vertical handoff between a WLAN and a broadband wireless communication network.

According to one aspect of the present invention, an apparatus for implementing a handoff between a WLAN and a broadband wireless communication network includes a BS of the broadband wireless network and at least one AP of the WLAN within the cell coverage area of the BS, and a switch for forwarding packets between the BS and the at least one AP and processing a handoff between the BS and the at least one AP.

According to another aspect of the present invention, there is provided a method in a switch for processing a vertical handoff in a wireless communication system including at least one AP within the cell coverage area of a BS of a broadband wireless network, and a switch for connecting the BS and the at least one AP, upon receipt of a vertical handoff request message from an SS associated with an AP, the vertical handoff message is converted to a handoff notification message used for the broadband wireless communication network, and transmitted to the BS. Upon receipt of a response message for the handoff notification message, a motion notification message notifying of the movement of the SS is transmitted to the AP.

According to a further aspect of the present invention, there is provided a method in a switch for processing a vertical handoff in a wireless communication system including at least one AP within the cell coverage of a BS of a broadband wireless network, and the switch for connecting the BS and the at least one AP, a handoff notification message notifying a handoff of an SS to an AP is received form the BS. Reception of a motion notification message notifying association of the SS with the AP is obtained from the AP, upon receipt of the handoff notification message. A response message for the handoff notification message is transmitted, upon receipt of the move notification message.

According to still another aspect of the present invention, there is provided an apparatus for implementing a vertical handoff between a WLAN and a broadband wireless communication network that includes a BS of the broadband wireless network and at least one AP of the WLAN within the cell coverage area of the BS, connected to the BS by a wireless link. The BS relays handoff messages between APs and processes a vertical handoff between the BS and the APs.

According to further still another aspect of the present invention, there is provided a method in an AP for processing a vertical handoff in a wireless communication system including at least one AP within the cell coverage area of a BS of a broadband wireless network, upon reception of a vertical handoff request message from an SS, a vertical handoff is completed by exchanging handoff control messages used for the broadband wireless communication network with the BS. After completing the vertical handoff, a response message for the vertical handoff request message is transmitted to the SS and a connection is released from the SS.

According to yet still a further aspect of the present invention, there is provided a method in a BS of a broadband wireless network for processing a vertical handoff in a wireless communication system including at least one an AP within the cell coverage of the BS, upon receipt of a vertical handoff request message from an SS, where a vertical handoff is completed by exchanging handoff control messages used for the broadband wireless communication network with an AP being a handoff target. following completion of the vertical handoff, a response message for the vertical handoff request message is transmitted to the SS. Upon reception of a handoff indication message from the SS after transmitting the response message, a connection is released from the SS.

According to yet another aspect of the present invention, there is provided a method of processing a vertical handoff in an SS associated with an AP in a wireless communication system including at least one AP within the cell coverage of a BS of a broadband wireless communication network, a signal is acquired from a neighboring BS by scanning. It is determined whether to perform a vertical handoff based on the received signal strength of the neighboring BS. When deciding on the vertical handoff, a vertical handoff request message is transmitted to the AP. Upon reception of a response message for the vertical handoff request message, it is determined whether the response message acknowledges the vertical handoff. When the vertical handoff is acknowledged, network entry into the BS is performed.

According to yet another further aspect of the present invention, there is provided a method of processing a vertical handoff in an SS associated with a BS of a broadband wireless communication network in a wireless communication system including at least one AP within the cell coverage of the BS, a signal is acquired from a neighboring AP by scanning. It is determined whether to perform a vertical handoff based on the received signal strength of the neighbor AP. When deciding on the vertical handoff, a vertical handoff request message is transmitted to the BS and then the SS is associated with the AP.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

A detailed description will now be made of vertical handoff between an 802.11 network and an 802.16 network.

Figure 1:
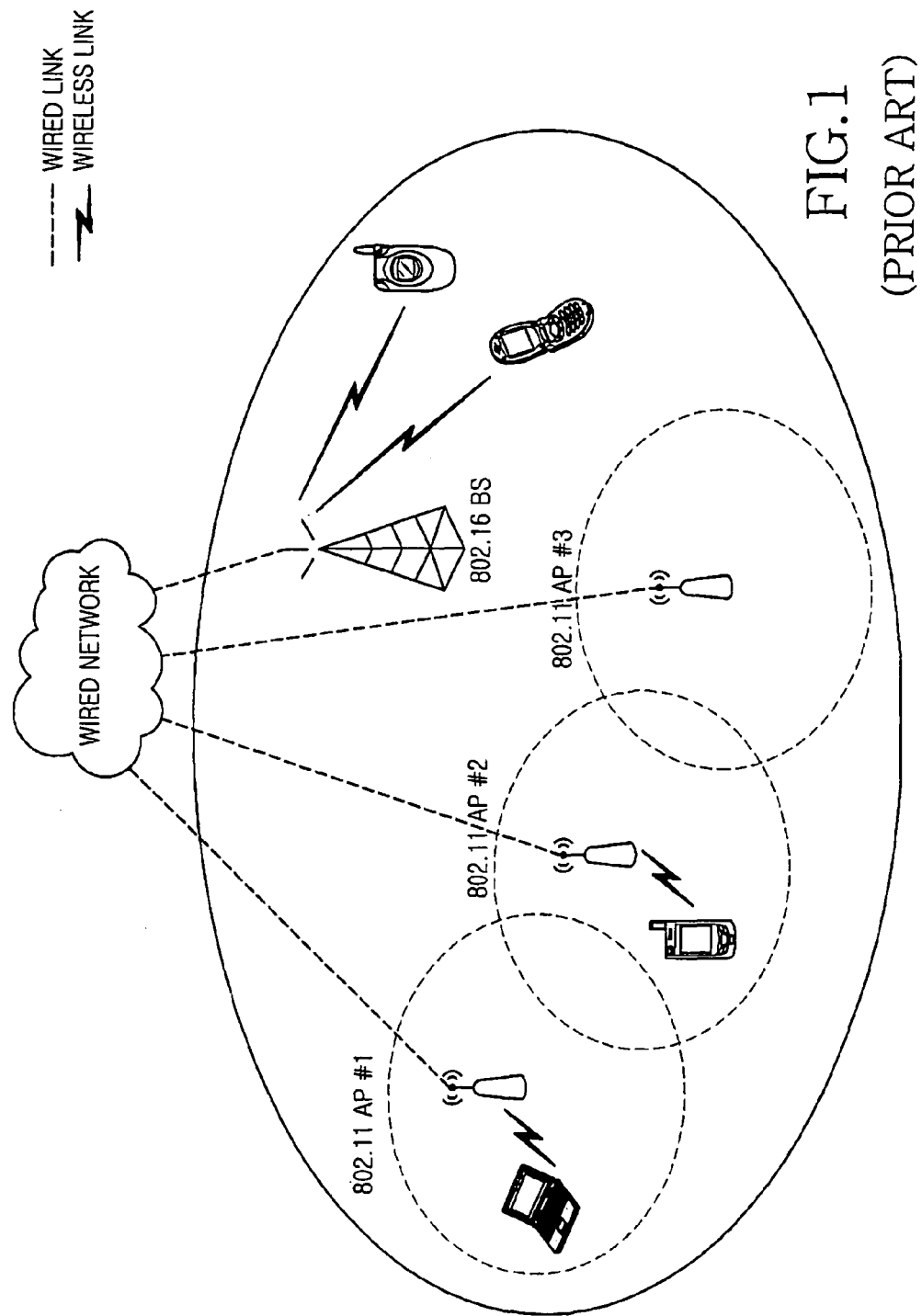
FIG. 1 illustrates a conventional system model in which an 802.11 network coexists with an 802.16 network.
Figure 2:
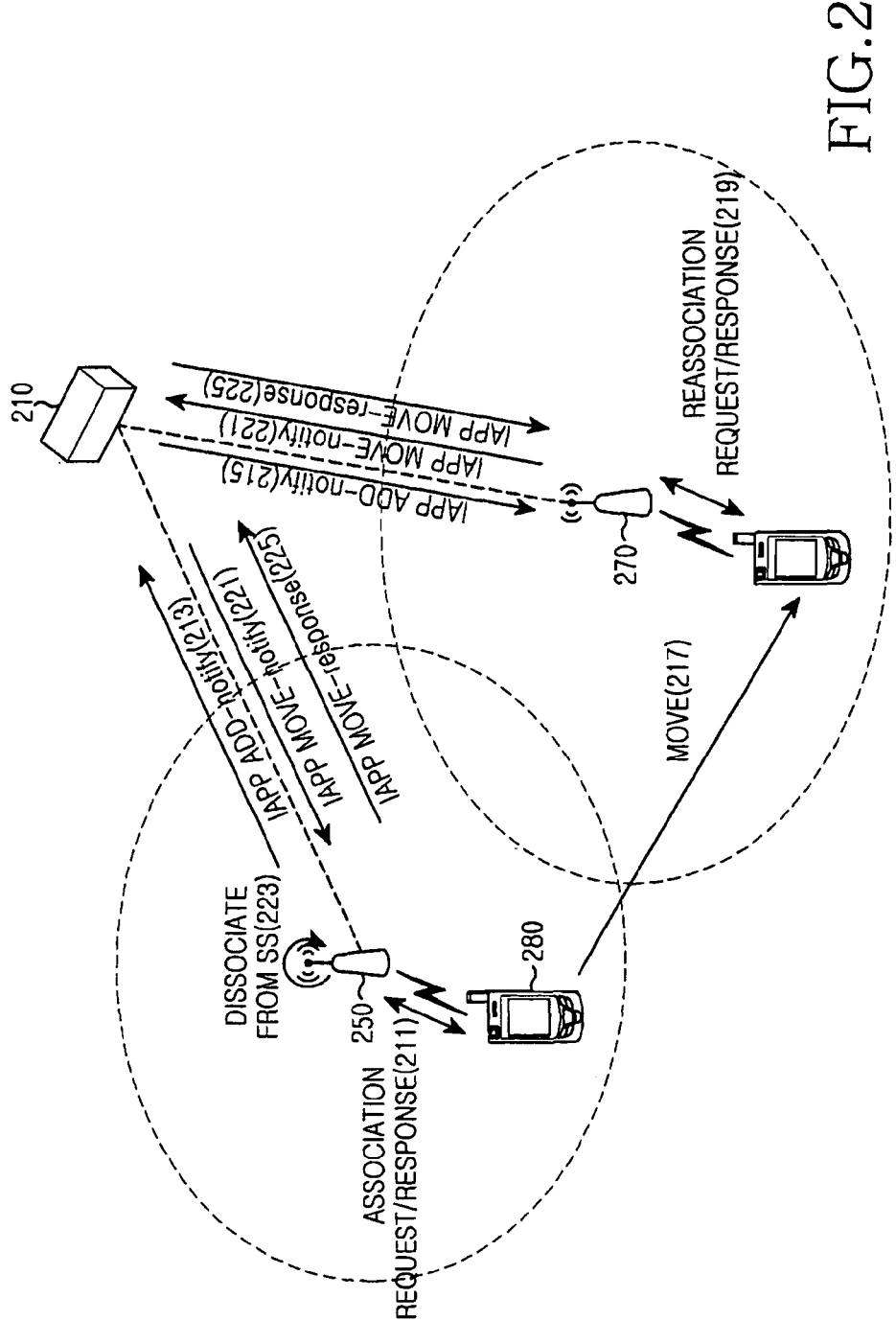
FIG. 2 illustrates a conventional handoff procedure in an 802.11 WLAN.
Figure 3:
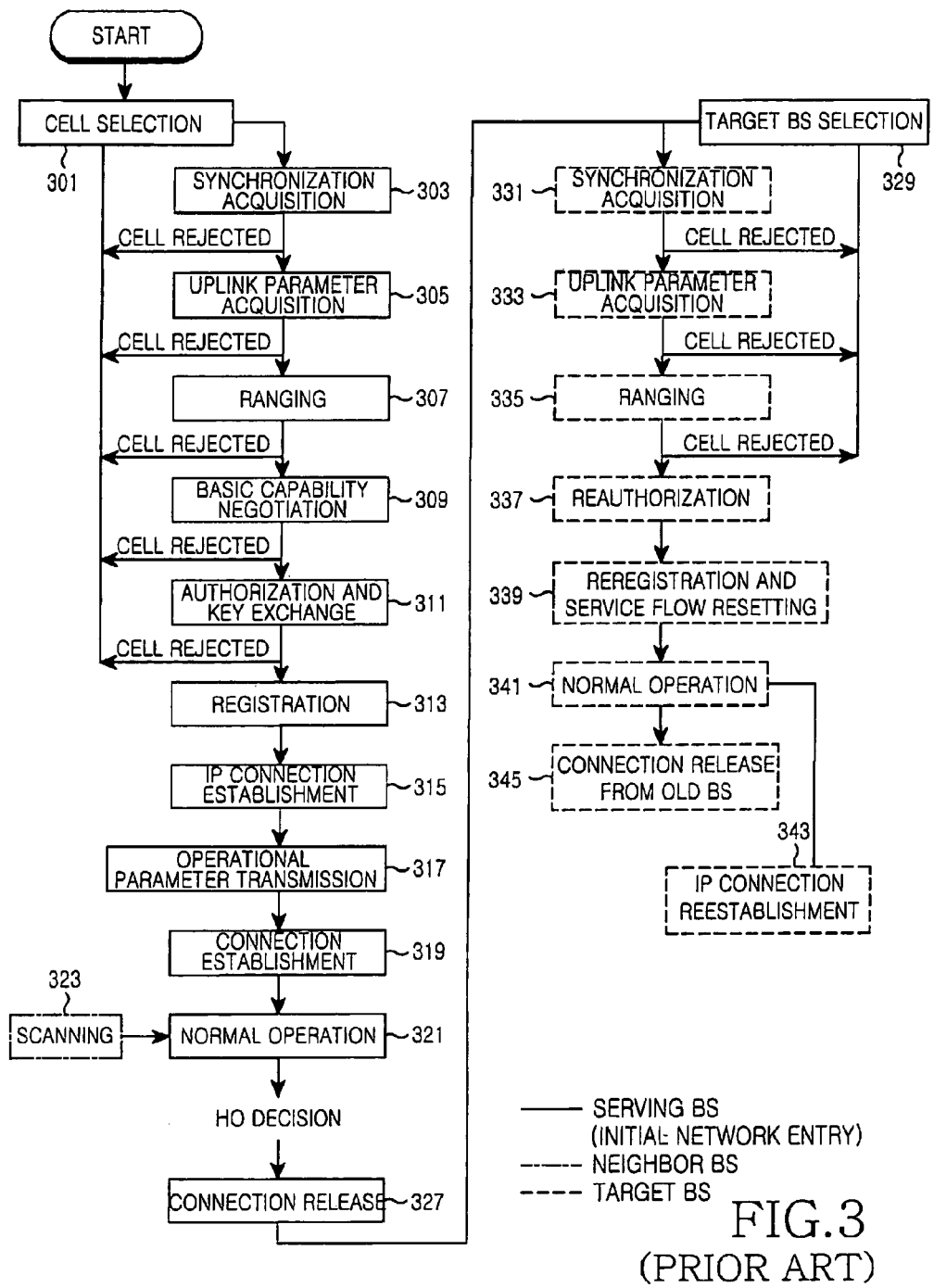
FIG. 3 is a flowchart illustrating a conventional handoff procedure for an MSS in an 802.16 broadband wireless communication network.
Figure 4:
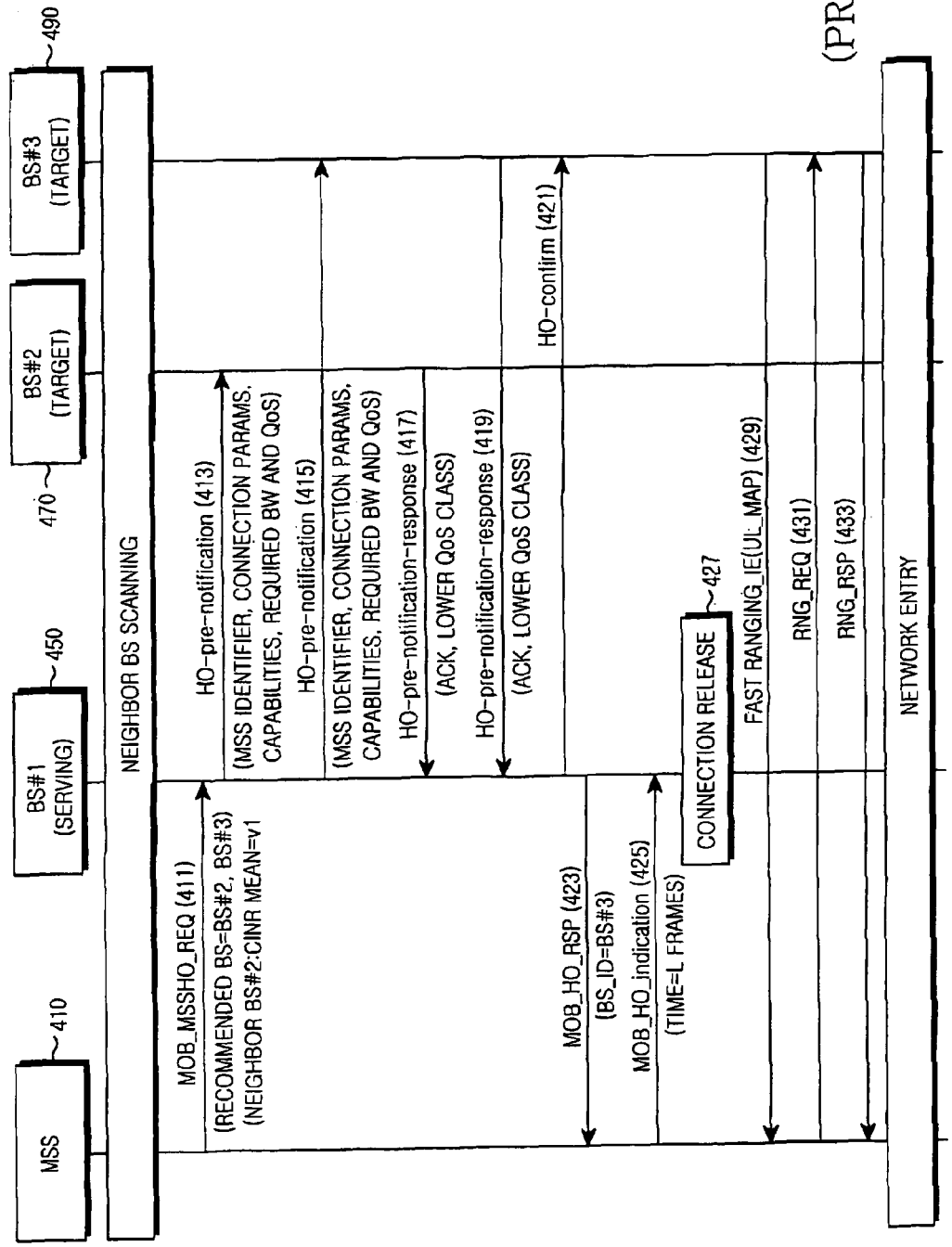
FIG. 4 is a diagram illustrating a signal flow for a conventional overall handoff procedure in the 802.16 broadband wireless communication network.
Figure 5:
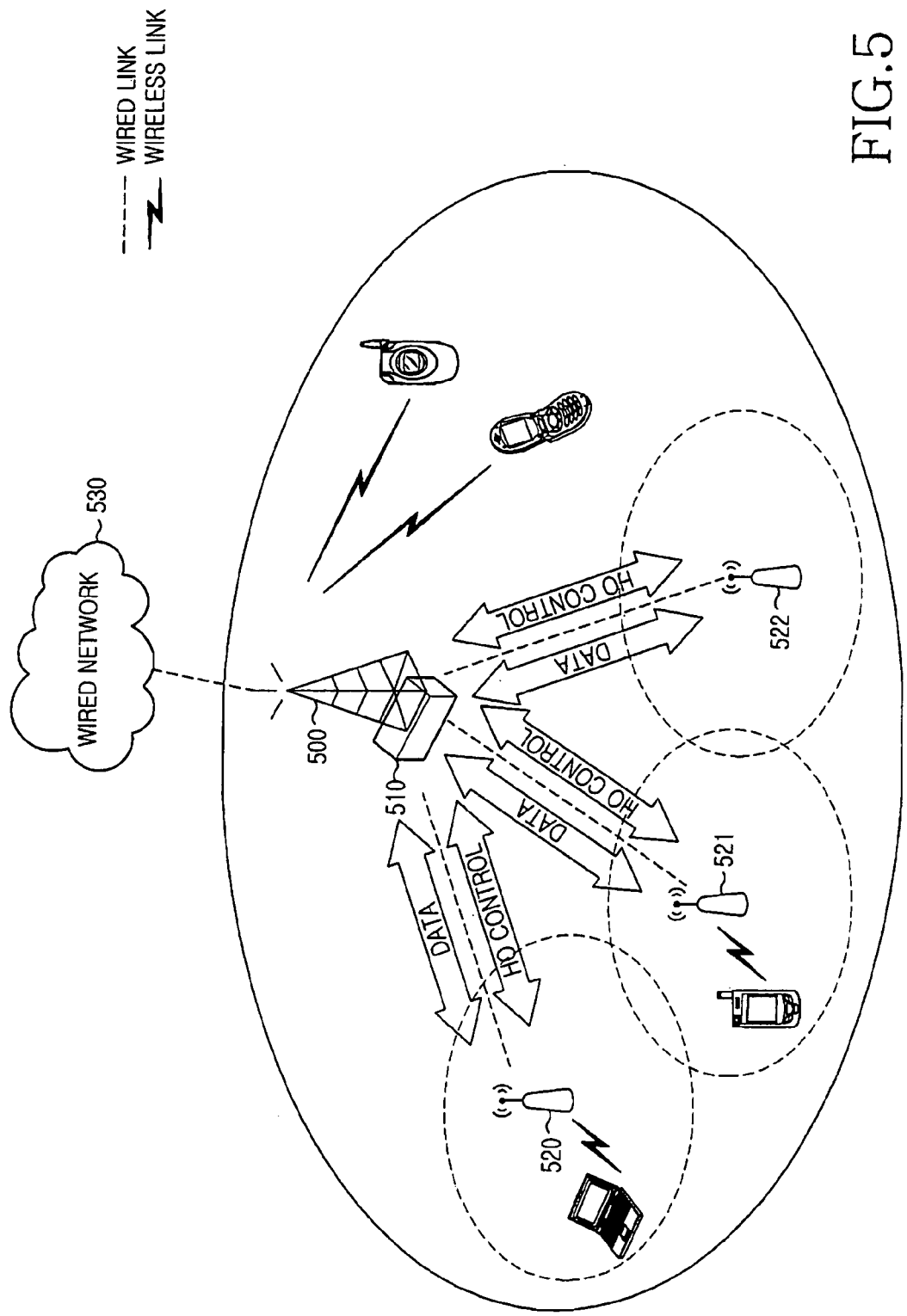
FIG. 5 is a diagram illustrates a system model according to a first embodiment of the present invention.

FIG. 5 is a diagram illustrating a system model according to the present invention. Referring to FIG. 5, a 802.16 BS 500 includes at least one 802.11 APs 520, 521 and 522 within its cell coverage area. A WS 510 is further provided to connect the BS 500 to the APs 520, 521 and 522 and a wired network (Internet) 530 by wired links. The WS 510 can be either incorporated into the BS 500 or separately configured. The WS 510 manages information about MSSs connected to the BS 500 and the APs 520, 521 and 522 (i.e. MAC, IP address, etc.) and controls handoff between APs or between the BS and an AP based on the information. This WS 510 includes at least three interfaces: one interfaces with the wired network 530, a second interfaces directly with the 802.16 BS 500 via an 802.16 MAC, and a third interfaces with the 802.11 APs 520, 521 and 522 by wired links. If a new MSS associates with an 802.11 AP 520, 521 or 522, or the 802.16 BS 500, information about the new MSS is transferred to the WS 510. The information may be signaled by a new defined message or by overlaying the header of an existing registration message.

The WS 510 can receive data from the wired network 530, the 802.11 network, or the 802.16 network. It forwards the received packet to the 802.16 network, the 802.11 network, or the wired network 530 according to the destination address of the packet.

In order to support horizontal handoff between 802.11 APs, the WS 510 manages information about MSSs connected to the 802.11 network and relays handoff information. For vertical handoff, the WS 510 converts/relays handoff messages between an 802.11 AP and an 802.16 BS. The system model illustrated in FIG. 5 offers the benefit of obviating the need for modifying the existing 802.16 protocols by adding a WS module to an 802.16 BS.

Figure 6:
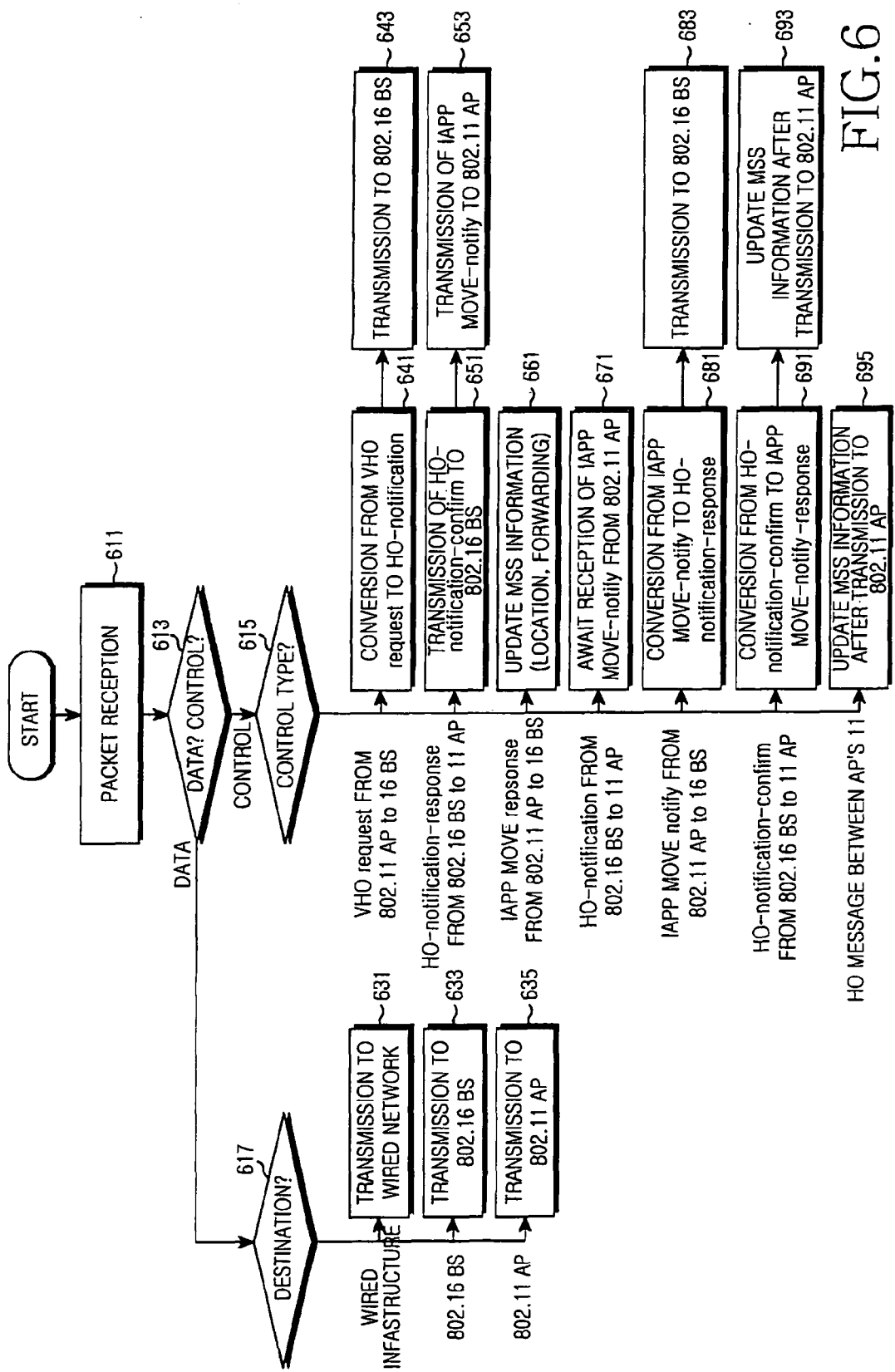
FIG. 6 is a detailed flowchart illustrating an operation of a WS according to the first embodiment of the present invention.

FIG. 6 is a detailed flowchart illustrating an operation of the WS 510 according to the present invention.

Referring to FIG. 6, the WS 510 monitors reception of a packet in step 611. Upon receipt of the packet, the WS 510 determines whether the received packet is a data packet or a control packet in step 613. In case of a data packet, the WS 510 determines where to forward the packet by checking the destination address of the packet in step 617.

If the destination is the wired Internet, the WS 510 forwards the data packet to the wired network in step 631. If the destination is the 802.16 network, the WS 510 forwards the data packet to an 802.16 BS in step 633. If the destination is the 802.11 network, the WS 510 forwards the data packet to an 802.11 AP in step 635.

In case of a control packet, the WS 510 checks the control type of the control packet in step 615. If the control packet is a Vertical HandOFF (VHO) request message directed from the 802.11 AP to the 802.16 BS, the WS 510 converts the VHO request message to an 802.16 HO-notification message in step 641 and transmits the HO-notification message to the 802.16 BS in step 643.

If the control packet is a HO-notification-response message directed from the 802.16 BS to the 802.11 AP, the WS 510 transmits the HO-notification-response message to the 802.16 BS in step 651 and then transmits an 802.11 IAPP MOVE-notification message to the 802.11 AP in step 653.

If the control packet is an IAPP MOVE-response message directed from the 802.11 AP to the 802.16 BS, the WS 510 updates information about a corresponding MSS (e.g. position and forwarding information, etc.) in step 661.

If the control packet is an HO-notification message directed from the 802.16 BS to the 802.11 AP, the WS 510 awaits reception of an IAPP MOVE-notify message from the 802.11 AP in step 671.

If the control packet is an IAPP MOVE-notify message directed from the 802.11 AP to the 802.16 BS, the WS 510 converts the IAPP MOVE-notify message to an 802.16 HO-notification response message in step 681 and sends it to the 802.16 BS in step 683.

If the control packet is an HO-notification-confirm message transmitted from the 802.16 BS to the 802.11 AP, the WS 510 converts the HO-notification-confirm message to an IAPP MOVE-notify-response message in step 691 and transmits it to the 802.11 AP and updates information regarding the MSS in step 693.

If the control packet is a handoff message between APs, the WS 510 transmits the handoff message to the 802.11 AP and updates information about the MSS in step 695. The horizontal handoff between the 802.11 APs is performed in compliance with the 902.11f draft described before. Notably, the message is relayed by the WS 510 in the 802.16 BS.

A vertical handoff procedure between the 802.11 network and the 802.16 network will be described below in detail.

A handoff is initiated in different manners in the 802.11 and 802.16 networks. According to the 802.11f draft, when the MSS decides on a handoff to a new AP by channel scanning, it re-associates with the new AP and the new AP transmits a handoff message to an old AP. In this way, the handoff is completed. That is, the MSS always initiates a handoff and communicates with the new AP only, without any communications with the old AP in IEEE 802.11.

Alternatively, both the MSS and the BS can perform handoff initiation in IEEE 802.16. After the MSS or the BS decides on a handoff, the old BS processes a handoff request. That is, the MSS releases a connection from the old BS before establishing a connection to the new BS. Considering the technological difference, the vertical handoff should be implemented between the 802.11 and 802.16 networks.

Figure 7:
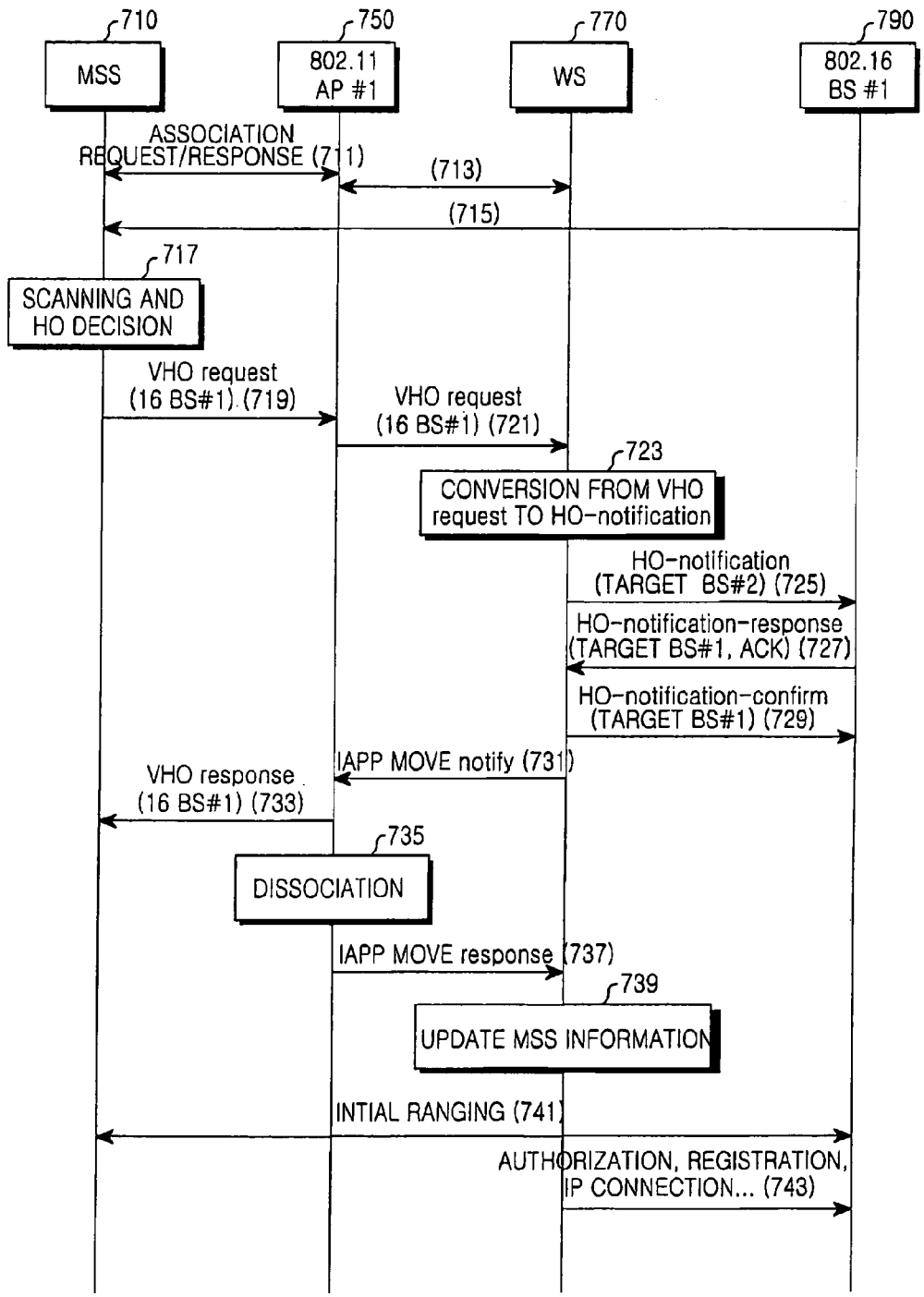
FIG. 7 is a diagram illustrating a signal flow for a handoff procedure between a WLAN and a broadband wireless communication network according to first the embodiment of the present invention.

FIG. 7 is a diagram illustrating a signal flow for a handoff procedure from a WLAN to a broadband wireless communication network according to the present invention.

Referring to FIG. 7, the illustrated call flow is for a vertical handoff of an MSS 710 from an 802.11 AP 750 to an 802.16 BS 790. A new message called "VHO request" is defined for vertical handoff initiation of the MSS associated with the AP.

According to the conventional 802.11f draft, during a handoff between 802.11 APs, the MSS 710 transmits a handoff request to a new AP, rather than to an old AP. Compared to this handoff initiation method, the MSS requests a handoff to an old BS. Thus, the conventional 802.11 technique needs some modification for vertical handoff between the 802.11 and 802.16 networks. In this context, the vertical handoff request message is defined. The vertical handoff request message is configured based on the structure of an 802.11 MAC control frame. In a control field of the control frame, a type value of '00' represents a Management type and one of reserved values, '0110' is allocated as a subtype. When the MSS 710 associated with the 802.11 AP 750 is to perform a vertical handoff to the 802.16 BS 790, it transmits this message to the old AP 750, requesting the handoff. Table 16 below illustrates the format of the VHO request message.

TABLE 16

| Information | Notes |
| --- | --- |
| Capability Information | Indicates request/advertised capability |
| Target BS Address | MAC address of target 802.16 BS |

Capability Information is the same field as Capability Information in an association request message. Since 11 Least Significant Bits (LSBs) are reserved, capability information or QoS information required for the handoff from the 802.11 network to the 802.16 network can be set in Capability Information. Target BS Address indicates a 48-bit (i.e. 6-byte) MAC address of a target 802.16 BS.

In operation, the MSS 710 associates with the 802.11 AP 750 by exchanging association request and response messages in step 711. In step 713, the 802.11 AP 750 transmits association information of the MSS 710 to the WS 770. Meanwhile, the MSS 710 obtains a signal from the 802.16 BS 790 by channel scanning in step 715 and decides on a vertical handoff to the 802.16 BS 790 in step 717.

In step 719, the MSS 710 transmits a VHO request message to the 802.11 AP. The 802.11 AP 750 forwards the VHO request message to the WS 770 in step 721.

The WS 770 converts the VHO request message to an 802.16 HO-notification message in step 723, transmits the HO-notification message to the 802.16 BS 790 as if it were an old 802.16 BS in step 725, receives an HO-notification-response message from the 802.16 BS 790 in step 727, and transmits an HO-notification-confirm message to the 802.16 BS 790 in step 729. The messages exchanged in steps 725, 727 and 729 are handoff-associated messages defined by the 802.16 standards.

In step 731, the WS 770 generates an 802.11 IAPP MOVE-notify message and transmits it to the AP 750. The AP 750 transmits a VHO response message for the VHO request message to the MSS 710 in step 733. The VHO response message is also configured based on the format of the 802.11 MAC control frame. In control fields of the control frame, a type value of '00' represents a Management type and one of reserved values, '0111' is allocated as a subtype. Table 17 below illustrates the VHO response message.

TABLE 17

| Information | Notes |
| --- | --- |
| Capability Information | Indicates request/advertised capability |
| Status Code | Success or failure of VHO request |
|  | 0: Successful |
|  | 1: Unspecified failure |
| Target BS Address | MAC address of target 802.16 BS in case Status Code is 0 |

The Capability Information and Status Code fields shown in Table 17 above are defined by the IEEE standards. Other information associated with the vertical handoff can be written in a reserved area of Status Code.

After transmitting the VHO response message, the AP 750 dissociates from the MSS 710 by releasing allocated resources and a connection from the MSS 710 in step 735 and transmits an IAPP MOVE-response message to the WS 770 in step 737. The WS 770 updates information about the MSS 710 (e.g., position and forwarding information), that is, updates the MSS information to the effect that the MSS 710 has associated with the BS 790 in step 739.

Finally, the MSS 710 performs initial ranging with respect to the target BS 790 in step 741 and carries out a network entry in step 743.

Figure 8:
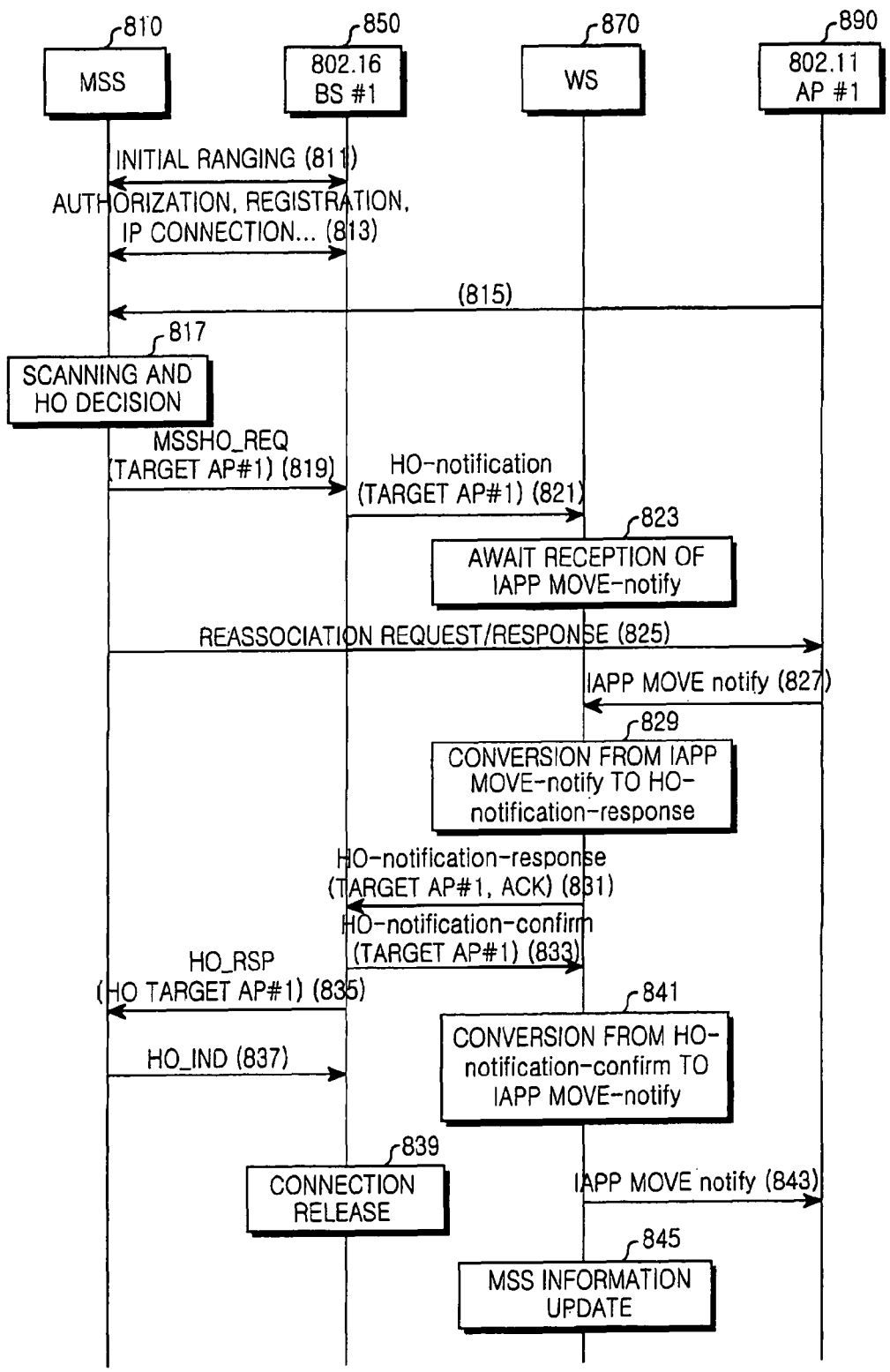
FIG. 8 is a diagram illustrating a signal flow for a handoff procedure from the broadband wireless communication network to the WLAN according to the first embodiment of the present invention.

FIG. 8 is a diagram illustrating a signal flow for a handoff procedure from the broadband wireless communication network to the WLAN according to the present invention. The illustrated signal flow is for vertical handoff of an MSS 810 from an 802.16 BS 850 to an 802.11 AP 890.

Referring to FIG. 8, the MSS 810 establishes a connection with the 802.16 BS 850 by initialization in steps 811 and 813. During a normal operation, the MSS 810 acquires a signal from the 802.11 AP 890 by scanning in step 815 and decides on a vertical handoff to the 802.11 AP 890 in step 817. The scanning complies with the 802.11f draft.

In step 819, the MSS 810 transmits an 802.16 MSS-HO_REQ message to the BS 850. A target BS is set to the AP 890. The BS 850 transmits an HO-notification message to a WS 870 in step 821, and the WS 870 awaits reception of an IAPP MOVE-notify message from the AP 890 in step 823.

After transmitting the MSSHO_REQ message, the MSS 810 transmits a reassociation request message to the AP 890 and awaits reception of a reassociation response message from the AP 890 in step 825. When the MSS 810 associated with the AP 890, the AP 890 transmits an IAPP MOVE-notify message to the WS 870 in step 827.

Then the WS 870 converts the IAPP MOVE-notify message to an 802.16 HO-notification-response message in step 829 and transmits the HO-notification-response message to the BS 850 in step 831. In step 833, the BS 850 transmits an HO-notification-confirm message to the WS 870. The BS 850 also transmits a BSHO_RSP message for the MSSHO_REQ message to the MSS 810 in step 835. The MSS 810 transmits an HO_IND message to the BS 850 in step 837. Upon reception of the HO_IND message, the BS 850 releases existing resources and connection from the MSS 810 in step 839.

Meanwhile, upon receipt of the HO-notification-confirm message, the WS 870 converts the HO-notification-confirm message to an 802.11 IAPP MOVE-notify message in step 841 and transmits the IAPP MOVE-notify message to the AP 890 in step 843. Then the WS 870 updates information about the MSS 810 (e.g., position and forwarding information) in step 845.

The case where the 802.11 AP is connected to the 802.16 NS by a wired link has been described so far. It can be further contemplated as another embodiment of the present invention that the 802.11 AP is connected to the 802.16 NS by a wireless link. Then the 802.16 BS recognizes the 802.11 AP as an SS.

Figure 9:
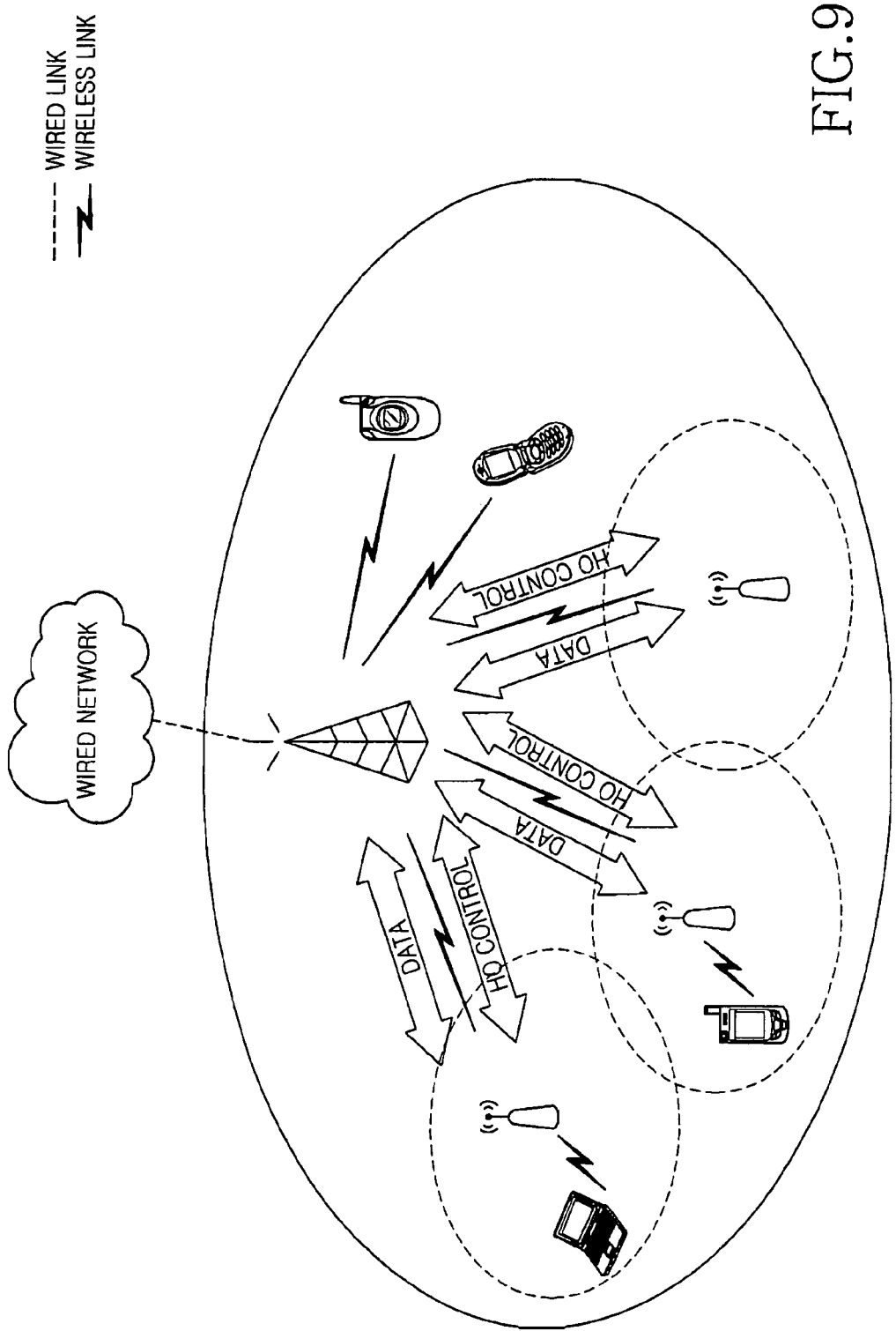
FIG. 9 is a diagram illustrating a system model according to a second embodiment of the present invention.

FIG. 9 illustrates a system model according to the present invention.

This system model is characterized in that the 802.16 BS serves as a last mile. In other words, the 802.11 AP is one MSS for the 802.16 BS. Therefore, the 802.11 AP should be provided with both 802.11 and 802.16 radio interfaces. The system model is viable because the 802.16 standards define a fixed 802.16 SS. It advantageously enables free deployment or elimination of an 802.11 AP.

Referring to FIG. 9, a consideration for the system model is which one between the 802.16 BS and the 802.11 AP is to manage an MSS connected to the 802.11 AP. Another consideration is how to transmit an inter-802.11 AP handoff message and a vertical handoff message. The two considerations will be addressed below.

Management of MSS Associated with 802.11 AP

Management of an MSS involves all of registration, IP address allocation, and authorization.

In the case where the 802.11 AP manages the SS, the 802.16 BS is not involved in managing an MSS associated with the AP. When the 802.11 AP is connected, the 802.16 BS allocates a plurality of IP addresses, for example, an IP prefix to the AP. The 802.11 AP allocates one of the IP addresses to the SS, as illustrated in FIG. 10.

Figure 10:
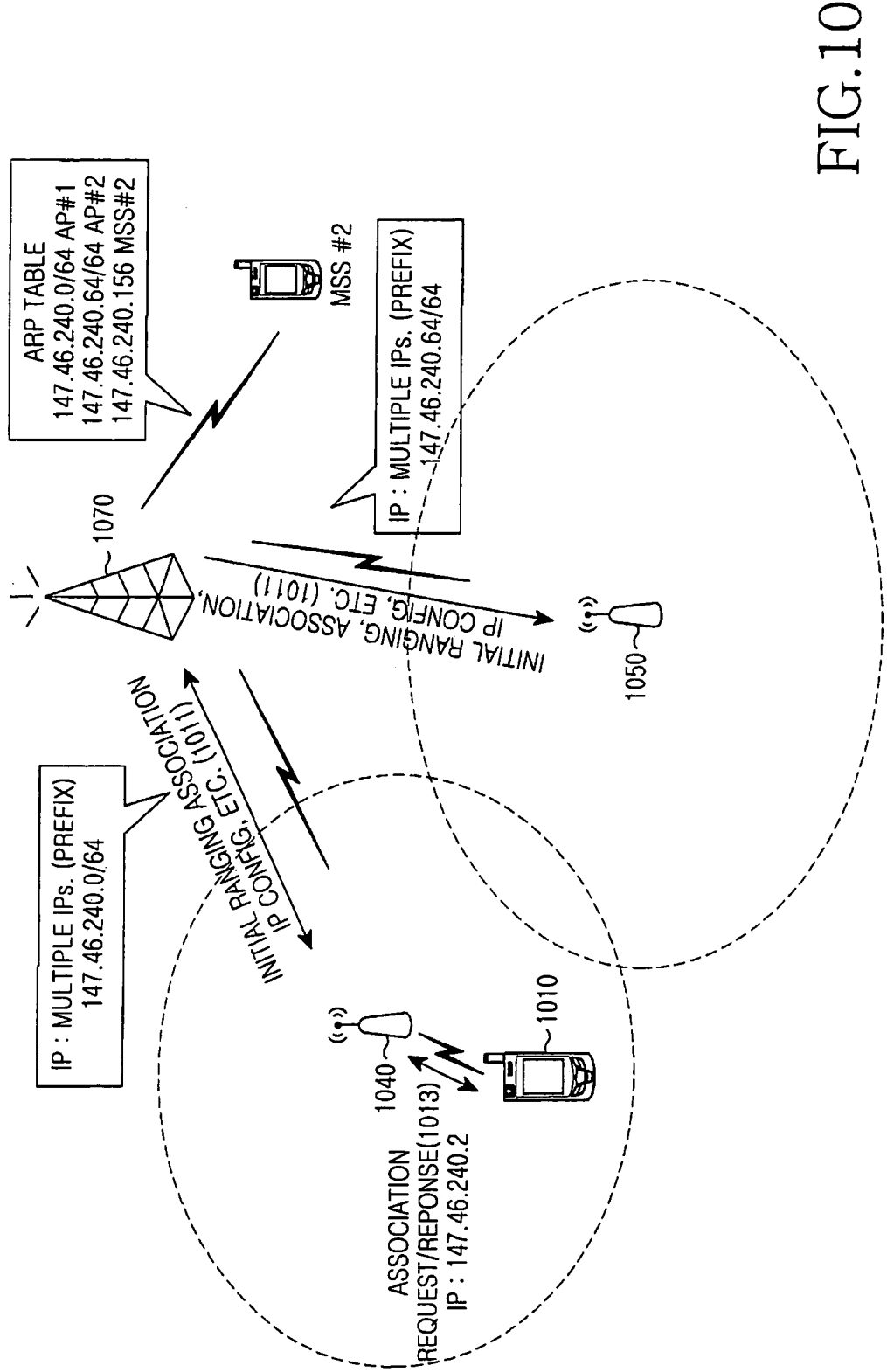
FIG. 10 is a diagram illustrating an example of an AP managing an MSS connected to a WLAN in the system model illustrated in FIG. 9.

Referring to FIG. 10, 802.11 APs 1040 and 1050 (AP#1 and AP#2) associate with an 802.16 BS 1070 and are allocated a plurality of IP addresses each in step 1011. For example, they are allocated IP prefixes. Meanwhile, the 802.16 BS 1070 has an ARP table in which IP addresses allocated to SSs are mapped to their MAC addresses. When a new MSS 1010 attempts to associate with the AP 1040, the AP 1040 allocates one of the IP addresses allocated by the 802.16 BS 1070 to the MSS 101 in step 1013.

In the case where the 802.16 BS also manages an MSS associated with the 802.11 AP, information about the MSS is also registered in the 802.16 BS. The 802.16 BS allocates an IP address and the allocated IP address is notified to the MSS via the 802.11 AP. This MSS management technique advantageously obviates the need for allocating a new IP address at a handoff between 802.11 APs or at a 802.11-802.16 vertical handoff. An example is presented in FIG. 11.

Figure 11:
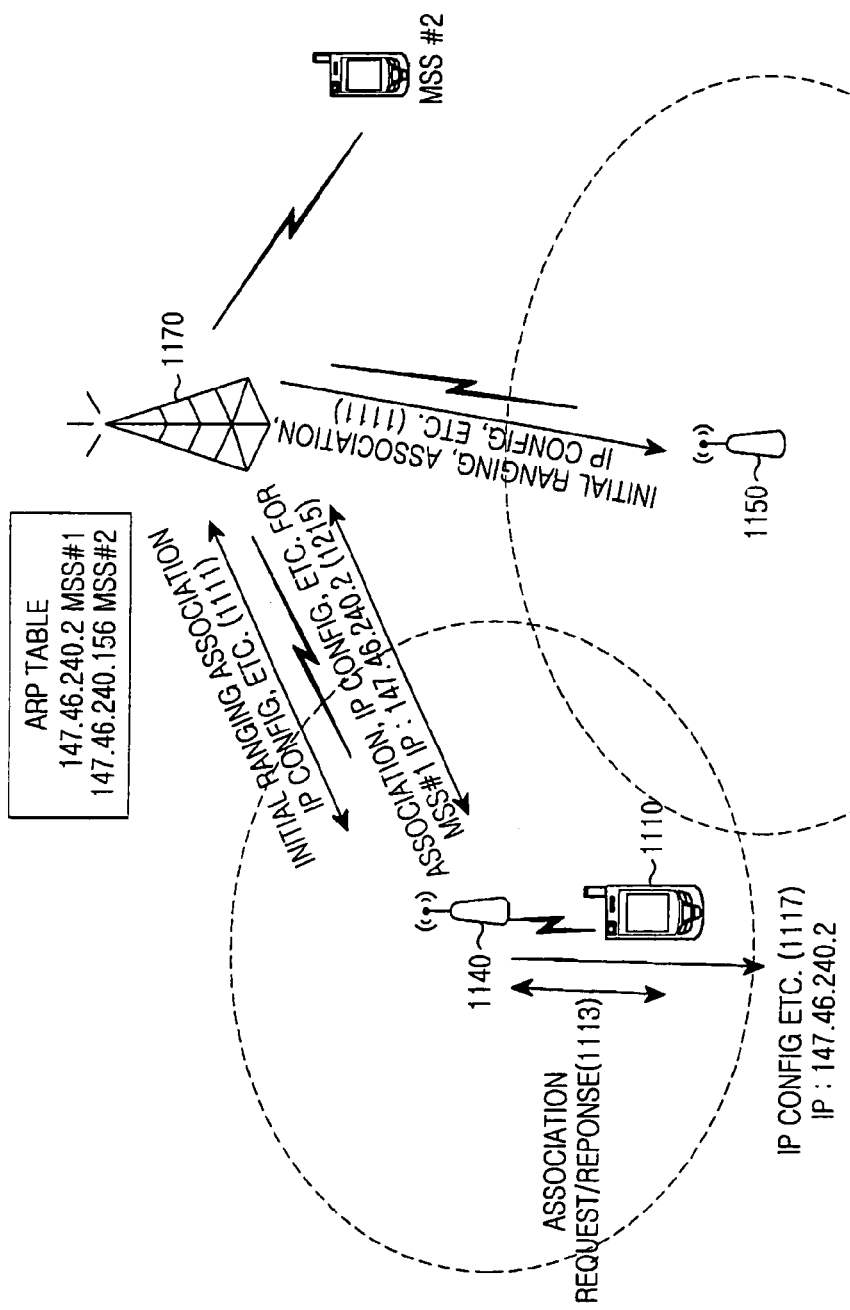
FIG. 11 is a diagram illustrating an example of a BS of a broadband wireless communication network managing an MSS connected to the WLAN in the system model illustrated in FIG. 9.

Referring to FIG. 11, 802.11 APs 1140 and 1150 (AP#1 and AP#2) associate with an 802.16 BS 1170 in step 1111. Later, a new MSS 1110 attempts to associate with the AP 1140 in step 1113. The AP 1140 transmits association information of the MSS 1110 to the 802.16 BS 1170. The 802.16 BS 1170 allocates a new IP address for the MSS 1110, while simultaneously updating the ARP table, and then informs the AP 1140 of the allocated IP address in step 1115. The AP 1140 transmits the allocated IP address to the MSS 1110 in step 1117.

The following description is made of management of an MSS associated with an 802.11 AP by an 802.16 BS, taking an example.

In the present invention, handoff between 802.11 APs complies with the 802.11f draft. One thing to note is that every message is converted to an 802.16 message and the 802.16 BS functions to relay handoff messages between the 802.11 APs. The handoff messages are sensitive to time and thus, they are signaled by Unsolicited Grant Service (USG).

Figure 12:
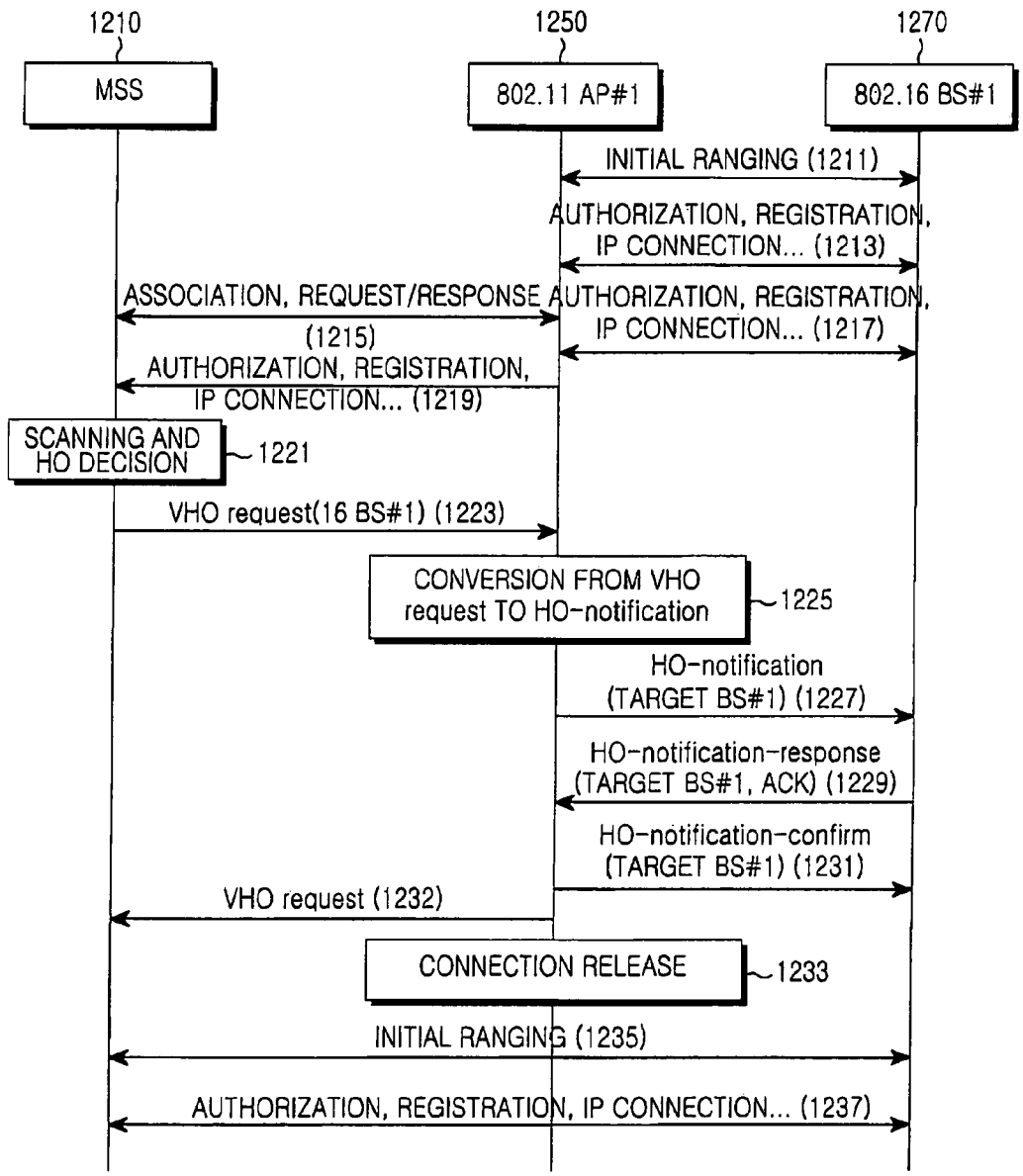
FIG. 12 is a diagram illustrating a signal flow for a handoff procedure from the WLAN to the broadband wireless communication network according to the second embodiment of the present invention.

FIG. 12 is a diagram illustrating a signal flow for a handoff procedure from the WLAN to the broadband wireless communication network according to the second embodiment of the present invention. The call flow is for a vertical handoff of an MSS 1210 from an 802.11 AP 1250 to an 802.16 BS 1290.

Referring to FIG. 12, the 802.11 AP 1250 associates with the 802.16 BS 1270 by initial ranging in step 1211 and performs authorization, registration, and IP connection in step 1213. In step 1215, the MSS 110 associates with the AP 1250 by exchanging association request and response messages. The AP 1350 acquires an IP address to be allocated to the MSS 1210 by authorization, registration, and IP connection to the BS 1270 in step 1217 and transmits the IP address to the MSS 1210 in step 1219.

In step 1221, the MSS 1210 acquires a signal from the BS 1270 by scanning and decides on a vertical handoff to the BS 1270. The MSS 1210 then transmits a VHO request message (refer to Table 16) to the AP 1250 in step 1223. The AP 1250 converts the VHO request message to an 802.16 HO-notification message in step 1225 and transmits the HO-notification message to the BS 1270 in step 1227.

The BS 1270 responds to the HO-notification message with an HO-notification-response message to the AP 1250 in step 1229 and the AP 1250 transmits an HO-notification-confirm message to the BS 1270 in step 1231. In step 1232, the AP 1250 transmits a VHO response message for the VHO request message to the MSS 1210.

The AP 1250 then dissociates from the MSS 1210 in step 1233. Hence, the MSS 1210 associates with the BS 1270 by initial ranging in step 1235 and performs initialization through authorization, registration and IP connection in step 1237. The authorization or IP connection may not be performed because the 802.16 BS 1270 already has knowledge of the MSS 1210.

Figure 13:
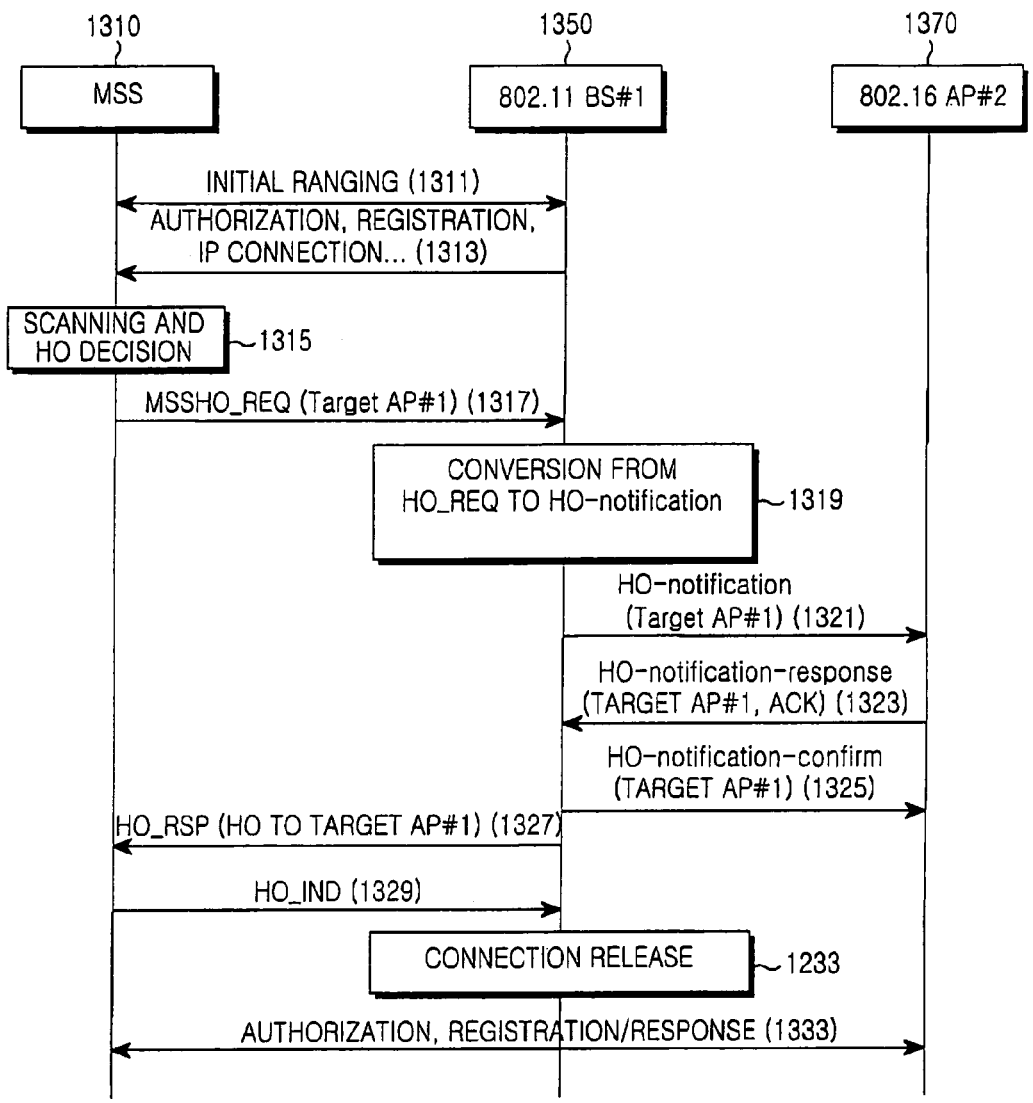
FIG. 13 is a diagram illustrating a signal flow for a handoff procedure from the broadband wireless communication network to the WLAN according to the second embodiment of the present invention.

FIG. 13 is a diagram illustrating a signal flow for a handoff procedure from the broadband wireless communication network to the WLAN according to the second embodiment of the present invention. The call flow is for a vertical handoff of an MSS 1310 from an 802.16 BS 1350 to an 802.11 AP 1370. The following description is made under the assumption that the 802.11 AP 1370 has been registered as an MSS to the 802.16 BS 1350.

Referring to FIG. 13, the MSS 1310 performs initial ranging in step 1311 and performs initialization through authorization, registration and IP connection in step 1313. Thus, the MSS 1310 associates with the 802.16 BS 1350. In step 1315, the MSS 1310 acquires a signal from the 802.11 AP 1370 by downlink scanning and decides on a vertical handoff to the AP 1370.

The MSS 1310 transmits an 802.11 MSSHO_REQ message to the BS 1350 in step 1317. The AP 1370 is set as a target BS. Upon reception of the MSSHO_REQ message, the BS 1350 determines the handoff target and if the target is an 802.11 AP, converts the MSSHO_REQ message to an HO-notification message in step 1319. In step 1321, the BS 1350 transmits the HO-notification message to the AP 1370.

The AP 1370 responds to the BS 1350 with an HO-notification-response message in step 1323 and the BS 1350 transmits an HO-notification-confirm message to the AP 1370 in step 1325.

Meanwhile, the AP 1370 transmits a BSHO_RSP message for the MSSHO_REQ message to the MSS 1310 in step 1327. The MSS 1310 transmits an HO_IND message to the BS 1350 in step 1329. In step 1331, the BS 1350 releases an existing connection form the MSS 1310. Later, the MSS 1310 associates with the AP 1370 by exchanging association request and response messages in step 1333. Since, the BS 1350 provides information about authorization, registration, and IP connection to the AR 1370, there is no need for re-setting the information.

As described above, an MSS of the present invention is a dual-mode MSS that can associate with both the WLAN and the broadband wireless communication network. The operation of the dual-mode MSS will be described below.

Figure 14:
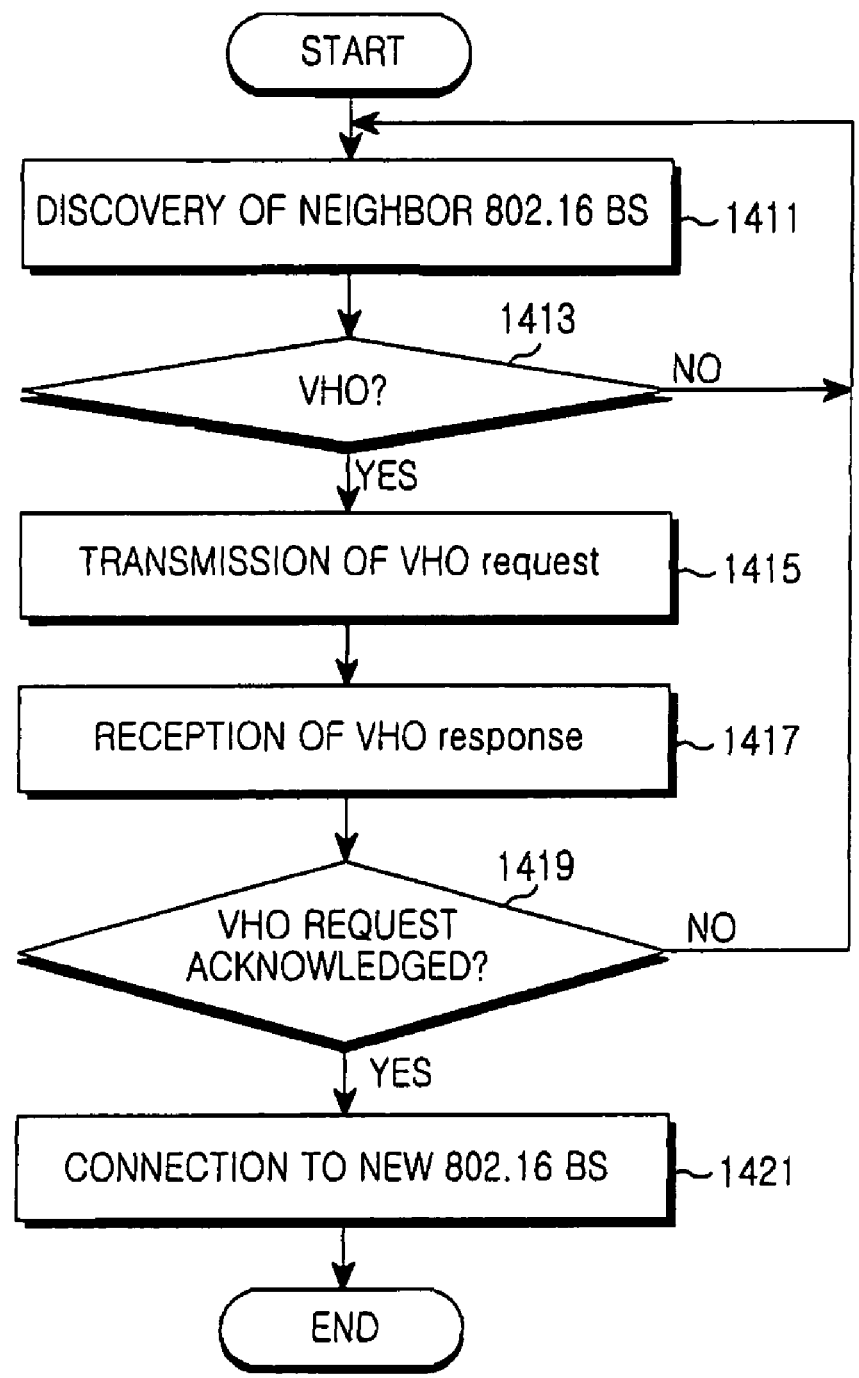
FIG. 14 is a flowchart illustrating a vertical handoff procedure from an 802.11 AP to an 802.16 BS in a dual-mode MSS according to the present invention.

FIG. 14 is a flowchart illustrating a vertical handoff procedure from an 802.11 AP to an 802.16 BS in a dual-mode MSS according to the present invention.

In the case of a vertical handoff from an 802.11 AP to an 802.16 BS, an MSS associated with the 802.11 AP acquires a signal from a neighbor 802.16 BS by scanning in step 1411 and decides on a vertical handoff by a vertical handoff determination algorithm in step 1413. In generation, the MSS decides on the vertical handoff by comparing the received signal strength of a serving BS with those of neighboring BSs. If the vertical handoff is not available, the MSS returns to step 1411.

If the vertical handoff is determined, the MSS generates a VHO request message (refer to Table 16) and transmits it to the 802.11 AP in step 1415 and monitors reception of a VHO response message (refer to Table 17) in step 1417.

Upon receipt of the VHO response message, the MSS determines whether the VHO response message acknowledges the VHO request in step 1419. If the VHO request is not acknowledged, the MSS returns to step 1411. If the VHO request is acknowledged, the MSS releases an existing connection form the 802.11 AP and associates with the 802.16 BS in step 1421.

Figure 15:
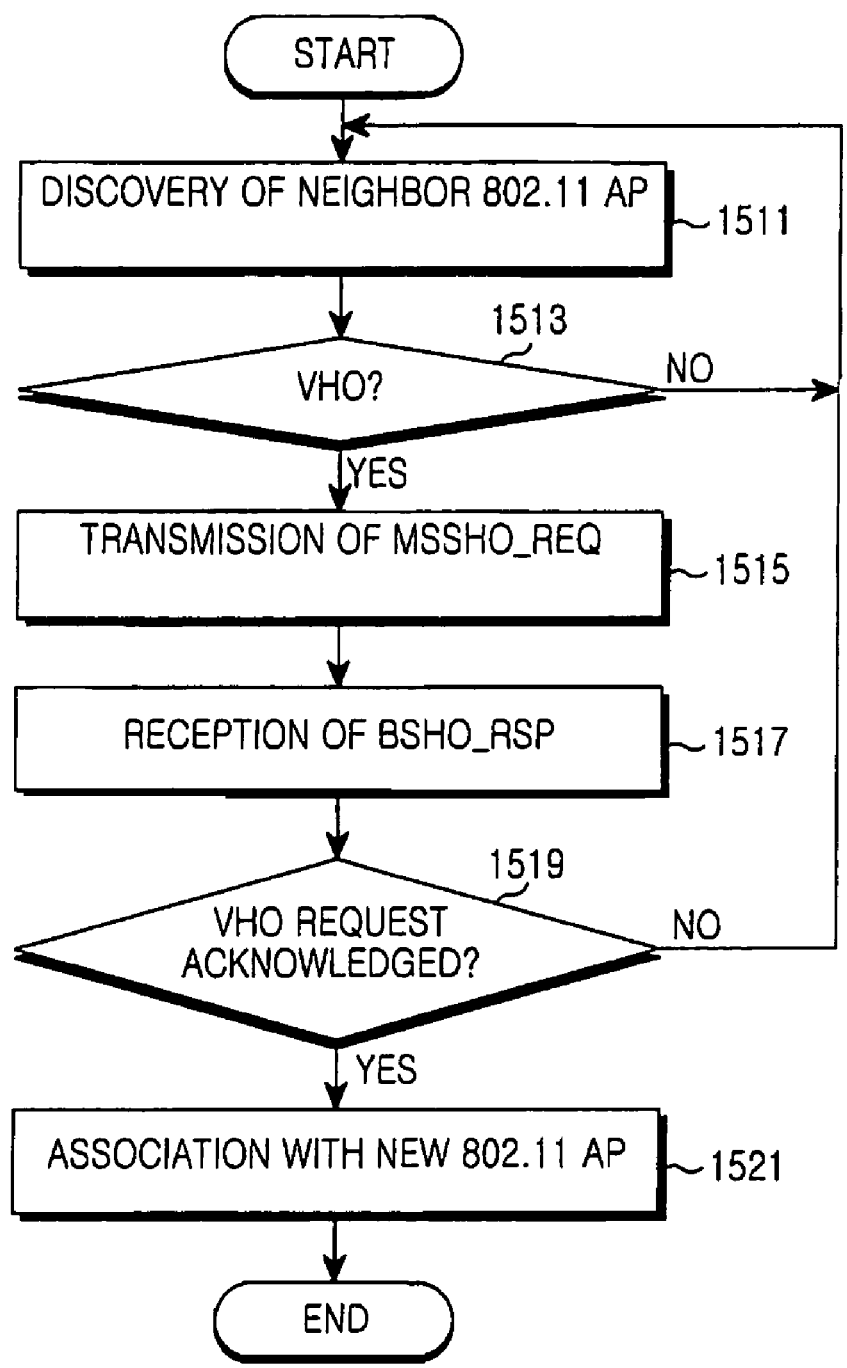
FIG. 15 is a flowchart illustrating a vertical handoff procedure form the 802.16 BS to the 802.11 AP in the dual-mode MSS according to the present invention.

FIG. 15 is a flowchart illustrating a vertical handoff procedure form the 802.16 BS to the 802.11 AP in the dual-mode MSS according to the present invention.

In the case of a vertical handoff from an 802.16 BS to an 802.11 AP, an MSS associated with the 802.16 BS acquires a signal from a neighbor 802.11 AP by scanning in step 1511 and decides on a vertical handoff by a vertical handoff determination algorithm in step 1513. If the vertical handoff is not available, the MSS returns to step 1511.

If the vertical handoff is decided, the MSS generates a 802.16 HO_REQ message and transmits it to the 802.16 BS in step 1515 and monitors reception of an HO_RSP message in step 1517.

Upon reception of the HO_RSP message, the MSS determines whether the HO_RSP message acknowledges the vertical handoff request in step 1419. If the vertical handoff request is not acknowledged, the MSS returns to step 1511. If the vertical handoff request is acknowledged, the MSS releases an existing connection form the 802.16 BS and associates with the 802.11 AP in step 1521.

As described above, the present invention provides a vertical handoff technique between an 802.11 WLAN and an 802.16 broadband wireless network. Since, the present invention supports the 802.11-802.16 vertical handoff, handoff between heterogeneous networks efficiently applies to a network with 802.11 and 802.16 networks being coexistent.

While the invention has been shown and described with reference to certain preferred embodiments thereof, they are merely exemplary applications. For example while the embodiments of the present invention have been described focusing on handoff between an 802.11 WLAN and an 802.16 broadband wireless network, the present invention is easily applicable to handoff between the broadband wireless network and any other network interworkable with the broadband wireless network. Therefore, it will be understood by those skilled in the art that various changes in form and details may be made therein without departing from the spirit and scope of the invention as defined by the appended claims.

What is claimed is:

1. A system for implementing a vertical handoff performed between heterogeneous networks, comprising:
   a Base Station (BS) of an 802.16 broadband wireless network;
   at least one Access Point (AP) of an 802.11 Wireless Local Area Network (WLAN) within cell coverage of the BS; and
   a switch for forwarding packets between the BS and the at least one AP and processing the vertical handoff between the BS and the at least one AP,
   wherein the switch comprises at least three interfaces which include a first interface for connecting to the BS, a second interface for connecting to the at least one AP and third interface for connecting to a wired network, and a message conversion module configured to convert a control message directly received from the BS to a control message directly transmitted to the at least one AP of the WLAN, and
   wherein the switch manages information about Subscriber Stations (SSs) associated with the BS and the at least one AP by storing therein updated position information about each of the SSs being connected to the BS and the at least one AP, respectively.

2. The system of claim 1, wherein the switch relays messages exchanged for a horizontal handoff between APs.

3. An apparatus for implementing a handoff performed between heterogeneous networks, comprising:
   a switch for forwarding packets between a Base Station (BS) of an 802.16 broadband wireless network and at least one AP of an 802.11 Wireless Local Area Network (WLAN) within cell coverage of the BS and processing a handoff between the BS and the at least one AP,
   wherein the switch comprises at least three interfaces which include a first interface for connecting to the BS, a second interface for connecting to the at least one AP and a third interface for connecting to a wired network, and is configured to convert a control message directly received from the BS to a control message directly transmitted to the at least one AP of the second wireless network, and
   wherein the switch manages information about Subscriber Stations (SSs) associated with the BS and the at least one AP by storing updated position information therein about each of the SSs being connected to the BS and the at least one AP, respectively.

* * * * *